United States Patent
Pease et al.

(10) Patent No.: US 8,692,927 B2
(45) Date of Patent: Apr. 8, 2014

(54) IMAGING TERMINAL HAVING FOCUS CONTROL

(75) Inventors: Michael Pease, Charlotte, NC (US);
Scott Garmon, Wesley Chapel, NC (US); Jeffrey Baker, Gastonia, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 212 days.

(21) Appl. No.: 13/009,323

(22) Filed: Jan. 19, 2011

(65) Prior Publication Data

US 2012/0182461 A1 Jul. 19, 2012

(51) Int. Cl.
*H04N 5/225* (2006.01)
*H04N 5/222* (2006.01)
*G03B 13/00* (2006.01)
*G06F 3/048* (2013.01)

(52) U.S. Cl.
USPC ...... 348/346; 348/333.12; 348/345; 348/326; 382/255; 715/767; 715/700; 715/802; 715/810; 396/102; 396/103; 396/121; 396/150

(58) Field of Classification Search
USPC .............. 348/345, 346, 326, 333.01, 333.02, 348/333.12, 745; 396/102–103, 121–124, 396/150–151; 382/255; 715/700, 716, 767, 715/802, 810, 813, 815, 828, 764; 282/255
See application file for complete search history.

(56) References Cited

U.S. PATENT DOCUMENTS

| | | | |
|---|---|---|---|
| 2,572,915 | A | 10/1951 | Devine |
| 3,138,706 | A | 6/1964 | Brown at al. |
| 3,678,836 | A | 7/1972 | Dietz |
| 3,918,071 | A | 11/1975 | Albrecht |
| 4,005,443 | A | 1/1977 | Albrecht |
| 4,072,969 | A | 2/1978 | Cheavin |
| 4,083,056 | A | 4/1978 | Nakamura et al. |

(Continued)

FOREIGN PATENT DOCUMENTS

WO WO 2004075096 A1 9/2004
WO 2010147609 A1 12/2010

OTHER PUBLICATIONS

Jun. 21, 2012 Communication pursuant to Article 94(3) EPC in European Application No. 12151182.8.

(Continued)

*Primary Examiner* — Lin Ye
*Assistant Examiner* — Marly Camargo
(74) *Attorney, Agent, or Firm* — Additon, Higgins, Pendleton & Ashe, P.A.

(57) ABSTRACT

There is set forth herein an imaging terminal having an image sensor array and a variable lens assembly for focusing an image onto the image sensor array. In one embodiment, an imaging terminal can include one or more focusing configuration selected from the group comprising a full set focusing configuration, a truncated set focusing configuration and a fixed focusing configuration. When a full set focusing configuration is active, a full set of candidate focus settings can be active when the imaging terminal determines a focus setting of the terminal responsively to a trigger signal activation. When a truncated set focusing configuration is active, a truncated range of candidate focus settings can be active when the imaging terminal determines a focus setting of the terminal responsively to a trigger signal activation. When a fixed focusing configuration is active, the focus setting of the imaging lens assembly can be fixed so that a predetermined lens assembly focus setting is active when a trigger signal is active.

15 Claims, 6 Drawing Sheets

(56) References Cited

U.S. PATENT DOCUMENTS

| | | |
|---|---|---|
| 4,183,641 A | 1/1980 | Kondo |
| 4,235,547 A | 11/1980 | Iwata |
| 4,283,129 A | 8/1981 | Bennick, Jr. |
| 4,320,947 A | 3/1982 | Komine |
| 4,326,790 A | 4/1982 | Hirata et al. |
| 4,472,040 A | 9/1984 | Kawabata |
| 4,473,284 A | 9/1984 | Hiramatsu et al. |
| 4,561,747 A | 12/1985 | Ohno et al. |
| 4,579,438 A | 4/1986 | Sato et al. |
| 4,692,007 A | 9/1987 | Vogt |
| 4,714,938 A | 12/1987 | Kazami et al. |
| 4,724,319 A | 2/1988 | Shirota |
| 4,816,860 A | 3/1989 | Iida et al. |
| 4,841,323 A | 6/1989 | Yamada et al. |
| 4,841,325 A | 6/1989 | Hoshino et al. |
| 4,860,045 A | 8/1989 | Hamada et al. |
| 4,868,592 A | 9/1989 | Suzuki et al. |
| 4,873,543 A | 10/1989 | Matsuzaki et al. |
| 4,876,564 A | 10/1989 | Amikura et al. |
| 4,908,645 A | 3/1990 | Higashihara et al. |
| 4,928,010 A | 5/1990 | Saito et al. |
| 4,933,692 A | 6/1990 | Kudo et al. |
| 4,935,763 A | 6/1990 | Itoh et al. |
| 4,949,107 A | 8/1990 | Kitagishi et al. |
| 4,959,675 A | 9/1990 | Seki et al. |
| 5,047,646 A | 9/1991 | Hattori et al. |
| 5,051,766 A | 9/1991 | Nonaka et al. |
| 5,072,250 A | 12/1991 | Makino |
| 5,130,734 A | 7/1992 | Taniguchi et al. |
| 5,148,210 A | 9/1992 | Minaki et al. |
| 5,157,435 A | 10/1992 | Min et al. |
| 5,249,011 A | 9/1993 | Sakai |
| 5,249,012 A | 9/1993 | Taniguchi et al. |
| 5,349,415 A | 9/1994 | Nishida |
| 5,497,209 A | 3/1996 | Iwane |
| 5,552,853 A | 9/1996 | Muramatsu et al. |
| 5,587,762 A | 12/1996 | Watanabe |
| 5,589,911 A | 12/1996 | Nonaka |
| 5,594,518 A | 1/1997 | Ohshita |
| 5,606,382 A | 2/1997 | Suh |
| 5,687,403 A | 11/1997 | Ohtake |
| 5,715,483 A | 2/1998 | Omata et al. |
| 5,721,970 A | 2/1998 | Ikeda |
| 5,742,850 A | 4/1998 | Nomura et al. |
| 5,758,206 A | 5/1998 | Imaoka |
| 5,828,499 A | 10/1998 | Ohtake |
| 5,875,359 A | 2/1999 | Ohtake et al. |
| 5,889,577 A | 3/1999 | Kohayakawa |
| 5,897,227 A | 4/1999 | Haraguchi et al. |
| 5,900,927 A | 5/1999 | Hasegawa |
| 5,907,724 A | 5/1999 | Uno et al. |
| 5,943,514 A | 8/1999 | Sato et al. |
| 5,965,894 A | 10/1999 | Krijn et al. |
| 5,966,551 A | 10/1999 | Haraguchi et al. |
| 5,973,846 A | 10/1999 | McConica |
| 5,973,855 A | 10/1999 | Shibayama |
| 5,980,125 A | 11/1999 | Julich |
| 5,995,766 A | 11/1999 | Yamashita |
| 6,038,404 A | 3/2000 | Suzuki et al. |
| 6,072,637 A | 6/2000 | Okada et al. |
| 6,091,452 A | 7/2000 | Nishiyama |
| 6,091,901 A | 7/2000 | Ogawa |
| 6,104,879 A | 8/2000 | Suzuki |
| 6,115,188 A | 9/2000 | Nishio et al. |
| 6,208,809 B1 | 3/2001 | Kanai et al. |
| 6,240,252 B1 | 5/2001 | Yamaguchi et al. |
| 6,246,833 B1 | 6/2001 | Harada |
| 6,266,486 B1 | 7/2001 | Kohno |
| 6,329,659 B1 | 12/2001 | Krijn et al. |
| 6,373,524 B2 | 4/2002 | Suda et al. |
| 6,374,060 B1 | 4/2002 | Mogamiya |
| 6,380,546 B1 | 4/2002 | Petrov et al. |
| 6,453,123 B1 | 9/2002 | Oshima |
| 6,549,729 B1 | 4/2003 | Robins et al. |
| 6,556,785 B2 | 4/2003 | Nonaka et al. |
| 6,614,998 B1 | 9/2003 | Senba et al. |
| 6,701,075 B2 | 3/2004 | Ogino |
| 6,718,132 B2 | 4/2004 | Nishina |
| 6,721,499 B2 | 4/2004 | Watanabe et al. |
| 6,895,181 B2 | 5/2005 | Nonaka et al. |
| 7,025,272 B2 | 4/2006 | Yavid et al. |
| 7,079,180 B1 | 7/2006 | Fukuda |
| 7,189,981 B2 | 3/2007 | Moon et al. |
| 7,262,418 B2 | 8/2007 | Lo et al. |
| 7,362,967 B2 | 4/2008 | Lan et al. |
| 7,410,100 B2 | 8/2008 | Muramatsu |
| 7,474,846 B2 | 1/2009 | Subbotin |
| 7,493,035 B2 | 2/2009 | Kuo et al. |
| 7,512,328 B2 | 3/2009 | Suda |
| 7,526,190 B2 | 4/2009 | Kato |
| 7,545,432 B2 | 6/2009 | Lee |
| 7,598,997 B2 | 10/2009 | Shiraishi |
| 7,600,192 B1 * | 10/2009 | Hashimoto et al. .......... 715/802 |
| 7,609,319 B2 | 10/2009 | Kobayashi |
| 7,614,559 B2 | 11/2009 | Sugimoto |
| 7,615,729 B2 | 11/2009 | Klein |
| 7,627,239 B2 | 12/2009 | Terayama |
| 7,634,186 B2 | 12/2009 | Nojima |
| 7,639,937 B2 | 12/2009 | Subbotin |
| 7,657,171 B2 | 2/2010 | Sundstrom |
| 7,726,573 B2 | 6/2010 | Gurevich et al. |
| 7,729,604 B2 | 6/2010 | Wen |
| 7,747,159 B2 | 6/2010 | Uenishi |
| 7,793,840 B2 | 9/2010 | Vinogradov |
| 7,796,875 B2 | 9/2010 | Lin et al. |
| 2002/0021895 A1 | 2/2002 | Kanai et al. |
| 2002/0021897 A1* | 2/2002 | Nakata .......................... 396/123 |
| 2002/0118966 A1 | 8/2002 | Hofer et al. |
| 2002/0154909 A1 | 10/2002 | Yamazaki et al. |
| 2003/0002867 A1 | 1/2003 | Ojala |
| 2003/0138742 A1 | 7/2003 | Irie et al. |
| 2003/0202788 A1 | 10/2003 | Watanabe et al. |
| 2004/0159703 A1 | 8/2004 | Kogan et al. |
| 2005/0045831 A1 | 3/2005 | Hendrik Maes et al. |
| 2005/0092841 A1 | 5/2005 | Barkan |
| 2005/0111842 A1 | 5/2005 | Nakagawa |
| 2005/0230633 A1 | 10/2005 | Lo et al. |
| 2005/0271373 A1 | 12/2005 | Tomita |
| 2006/0038017 A1 | 2/2006 | Carlson et al. |
| 2006/0060789 A1 | 3/2006 | Rogers |
| 2006/0097184 A1 | 5/2006 | Frosien |
| 2006/0127078 A1 | 6/2006 | Onozawa |
| 2006/0228098 A1 | 10/2006 | Yoshida |
| 2007/0047942 A1 | 3/2007 | Chang et al. |
| 2007/0077048 A1 | 4/2007 | Liao et al. |
| 2007/0140677 A1 | 6/2007 | Hsieh et al. |
| 2007/0201852 A1 | 8/2007 | Cheng |
| 2007/0269197 A1 | 11/2007 | Ide et al. |
| 2007/0280664 A1 | 12/2007 | Ikeda et al. |
| 2008/0037974 A1 | 2/2008 | Chi |
| 2008/0080848 A1 | 4/2008 | Tsai |
| 2008/0124068 A1 | 5/2008 | Kwon et al. |
| 2008/0166117 A1 | 7/2008 | Li et al. |
| 2008/0217553 A1 | 9/2008 | Ohtoshi et al. |
| 2008/0240700 A1 | 10/2008 | Takagi |
| 2009/0016708 A1 | 1/2009 | Takeuchi |
| 2009/0016709 A1 | 1/2009 | Wen |
| 2009/0045259 A1 | 2/2009 | Ehrhart et al. |
| 2009/0074393 A1 | 3/2009 | Park et al. |
| 2009/0116829 A1 | 5/2009 | Subbotin |
| 2009/0142046 A1 | 6/2009 | Lin et al. |
| 2009/0169193 A1 | 7/2009 | Wen |
| 2009/0236424 A1 | 9/2009 | Hennick et al. |
| 2009/0256081 A1 | 10/2009 | Kaga |
| 2009/0310954 A1 | 12/2009 | Chang et al. |
| 2010/0020222 A1* | 1/2010 | Jones et al. .............. 348/333.02 |
| 2010/0044440 A1 | 2/2010 | Wang et al. |
| 2010/0079602 A1 | 4/2010 | Napper et al. |
| 2010/0098395 A1 | 4/2010 | Hiraoka |
| 2010/0104271 A1 | 4/2010 | Park et al. |
| 2010/0124413 A1 | 5/2010 | Moon |
| 2010/0157086 A1* | 6/2010 | Segale et al. ................ 348/222.1 |
| 2010/0189427 A1 | 7/2010 | Ilya et al. |

(56) References Cited

U.S. PATENT DOCUMENTS

2010/0247084 A1 9/2010 Kato
2010/0278520 A1 11/2010 Karasawa
2012/0092531 A1 4/2012 Koziol et al.

OTHER PUBLICATIONS

Jun. 1, 2012 European Search Report in European Application No. 12151182.8.

* cited by examiner

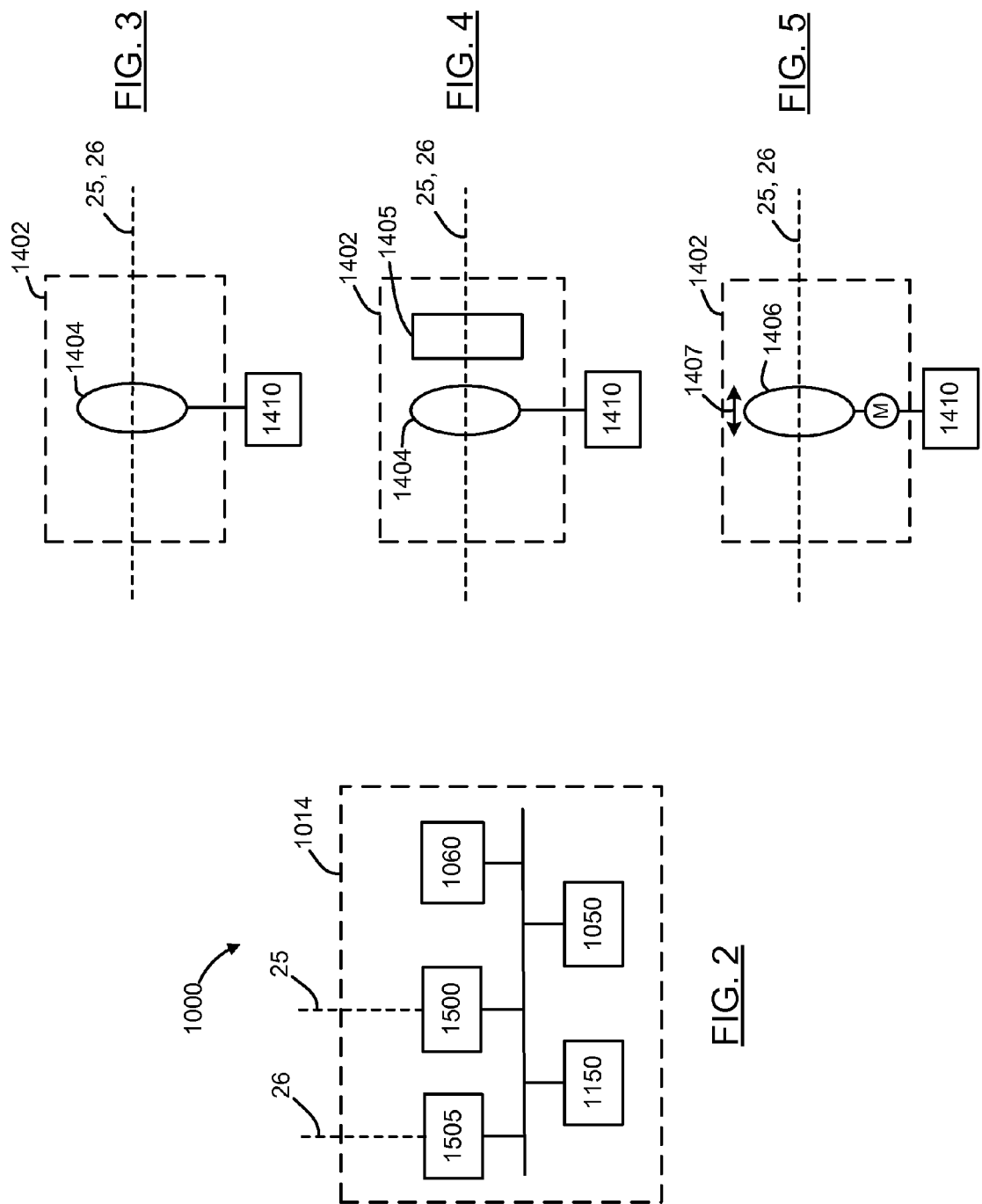

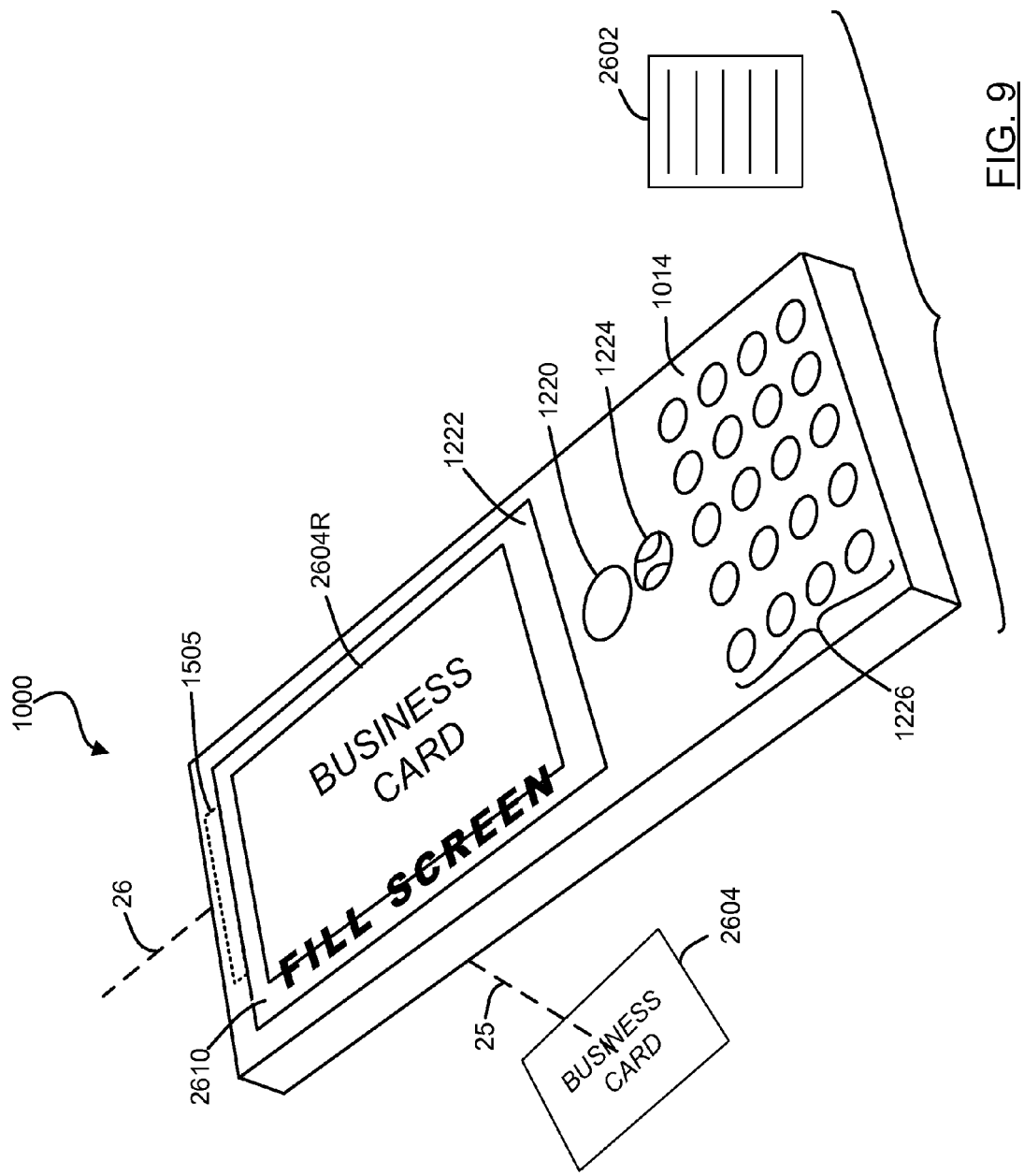

IMAGING TERMINAL HAVING FOCUS CONTROL

FIELD OF THE INVENTION

The present invention relates in general to optical based registers, and particularly is related to an image sensor based imaging terminal.

BACKGROUND OF THE INVENTION

In spite of considerable advances in imaging technologies electronics, imaging terminals which are capable of capturing images continue to be plagued slow image output times which frustrate users of such terminals. Advances in imaging technology have actually been observed in some instances to increase rather than decrease an observed image output time of an imaging. One example is increased pixel resolution. Image sensors are being made available with ever increasing pixel resolution. Megapixel imagers are now commonplace. However, a high pixel count often leads to a longer readout delay and longer processing delay for processing image data corresponding to pixels of an image sensor pixel array. Imaging optics technologies have also improved. Imaging lens assemblies are available with variable focus settings allowing the plane of optimum focus position of a lens assembly to be adjusted between, near, intermediate, and far focus positions. Such imaging lens assemblies have the capacity to allow the capture of high quality sharply focused images at various terminal to target distances within a range of terminal to target distances. However, like terminals with increased pixel resolution, terminals with variable focus position lens assemblies have been observed to exhibit considerable image output times.

SUMMARY OF THE INVENTION

There is set forth herein an imaging terminal having an image sensor array and a variable lens assembly for focusing an image onto the image sensor array. In one embodiment, an imaging terminal can include one or more focusing configuration selected from the group comprising a full set focusing configuration, a truncated set focusing configuration and a fixed focusing configuration. When a full set focusing configuration is active, a full set of candidate focus settings can be active when the imaging terminal determines a focus setting of the terminal responsively to a trigger signal activation. When a truncated set focusing configuration is active, a truncated range of candidate focus settings can be active when the imaging terminal determines a focus setting of the terminal responsively to a trigger signal activation. When a fixed focusing configuration is active, the focus setting of the imaging lens assembly can be fixed so that a predetermined lens assembly focus setting is active when a trigger signal is active.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 2 is a block diagram of an imaging terminal having a plurality of imaging subsystems;

FIGS. 3-5 are block diagrams of various embodiment of variable lens assemblies for use in an imaging subsystem;

FIG. 9 is a perspective physical form view of a system comprising an imaging terminal.

DETAILED DESCRIPTION OF THE INVENTION

Figure 1:
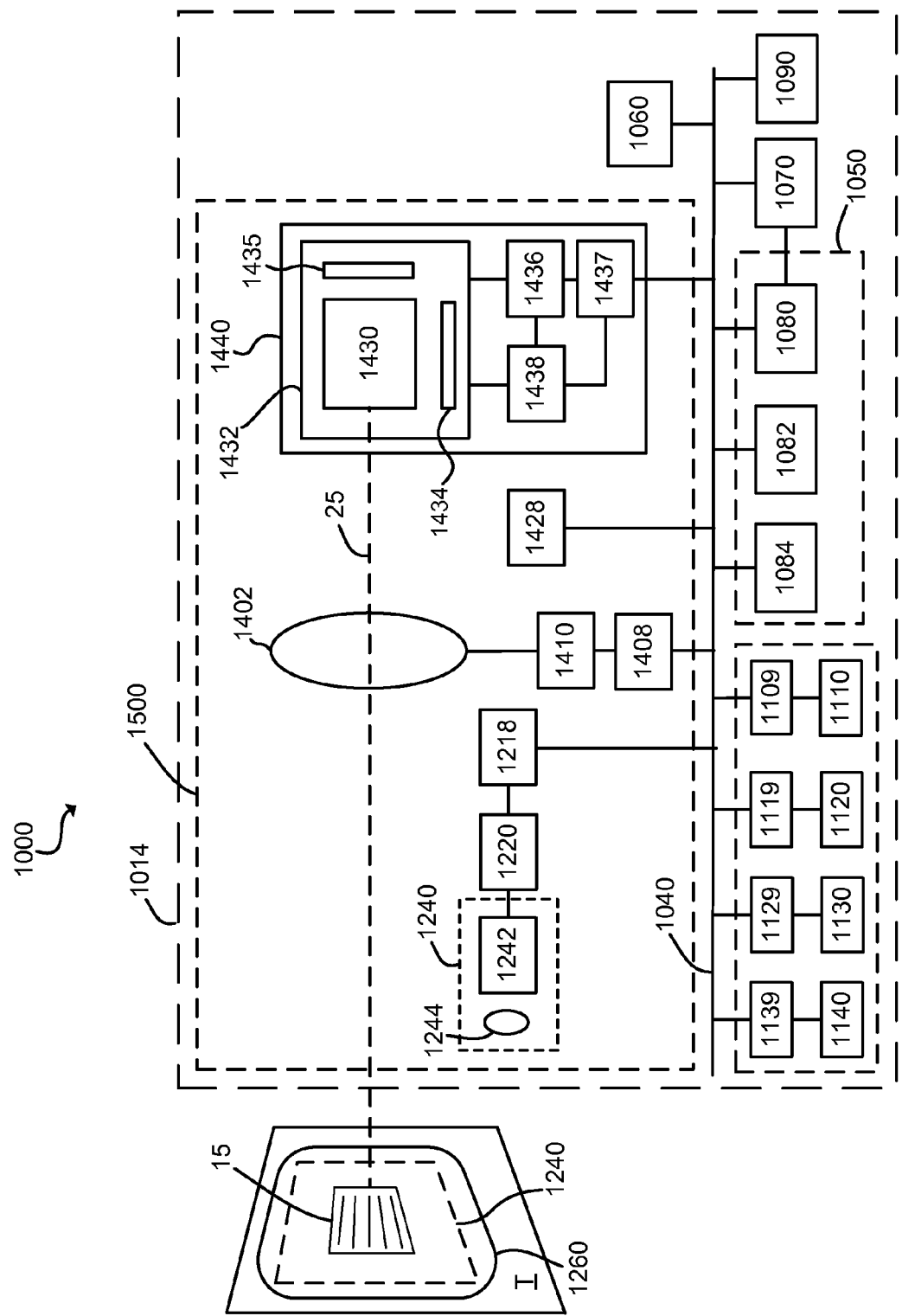
FIG. 1 is a block diagram of an imaging terminal having an imaging subsystem.

There is set forth herein an imaging terminal having an image sensor array and a variable lens assembly for focusing an image onto the image sensor array. In one embodiment, an imaging terminal can include one or more focusing configuration selected from the group comprising a full set focusing configuration, a truncated set focusing configuration and a fixed focusing configuration. When a full set focusing configuration is active, a full set of candidate focus settings can be active when the imaging terminal determines a focus setting of the terminal responsively to a trigger signal activation. When a truncated set focusing configuration is active, a truncated range of candidate focus settings can be active when the imaging terminal determines a focus setting of the terminal responsively to a trigger signal activation. When a fixed focusing configuration is active, the focus setting of the imaging lens assembly can be fixed so that a predetermined lens assembly focus setting is active when a trigger signal is active.

An exemplary hardware platform for support of operations described herein with reference to an image sensor based indicia reading terminal is shown and described with reference to FIG. 1.

Indicia reading terminal 1000 can include an image sensor 1432 comprising a multiple pixel image sensor array 1430 having pixels arranged in rows and columns of pixels, associated column circuitry 1034 and row circuitry 1435. Associated with the image sensor 1432 can be amplifier circuitry 1436 (amplifier), and an analog to digital converter 1437 which converts image information in the form of analog signals read out of image sensor array 1430 into image information in the form of digital signals. Image sensor 1432 can also have an associated timing and control circuit 1438 for use in controlling e.g., the exposure period of image sensor 1432, gain applied to the amplifier 1436. The noted circuit components 1432, 1436, 1437, and 1438 can be packaged into a common image sensor integrated circuit 1440. Image sensor integrated circuit 1440 can incorporate fewer than the noted number of components. In one example, image sensor integrated circuit 1440 can be provided e.g., by an MT9V022 (752×480 pixel array) or an MT9V023 (752×480 pixel array) image sensor integrated circuit available from Micron Technology, Inc. In one example, image sensor integrated circuit 1440 can incorporate a Bayer pattern filter, so that defined at the image sensor array are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, CPU 1060 prior to subjecting a frame to further processing can interpolate pixel values at frame pixel positions intermediate of green pixel positions utilizing green pixel values for development of a monochrome frame of image data. Alternatively, CPU 1060 prior to subjecting a frame for further processing can interpolate pixel values intermediate of red pixel positions utilizing red pixel values for development of a monochrome frame of image data. CPU 1060 can alternatively prior to subjecting a frame for further processing can interpolate pixel values intermediate of blue pixel positions utilizing blue pixel values.

In the course of operation of terminal 1000, image signals can be read out of image sensor 1432, converted, and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1432 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1432 and RAM 1080 are within the scope and the spirit of the invention.

Referring to further aspects of terminal 1000, lens assembly 1402 can be adapted for focusing an image of an article 15 located within a field of view 1440 on a substrate, T, onto image sensor array 1430. A size in paper space of a field of view 1440 of terminal 1000 can be varied in a number of alternative ways. A size in target space of a field of view 1440 can be varied e.g. by changing a terminal to target distances, changing an imaging lens assembly focus setting, changing a number of pixels of image sensor array 1430 that are subject to read out. Imaging light rays can be transmitted about imaging axis 25. Lens assembly 1402 can be adapted to be capable of multiple focal lengths and multiple planes of optical focus (best focus distances).

Terminal 1000 can also include a number of peripheral devices including trigger 1110 which may be used to make active a trigger signal for activating frame readout and/or certain decoding processes. In addition to having trigger 1110, imaging terminal 1000 can have a display 1120, a pointer mechanism 1130, and a keyboard 1140. The devices 1110, 1120, 1130, 1140 can be coupled to system bus 1040 for communication with CPU 1060.

Further regarding trigger 1110, terminal 1000 can be adapted so that actuation of trigger 1110 activates a trigger signal and initiates output of one or more frame of image data. Specifically, terminal 1000 can be operative so that in response to activation of a trigger signal, a succession of frames can be by way of read out of image data from image sensor array 1430 (typically in the form of analog signals) and then storage of the image information after conversion into memory 1080 (which can buffer one or more of the succession of frames at a given time). Frames can be read out of image sensor array 1430 at a rate known as a frame rate. A time for read out of a frame can be regarded as a frame time, and can be given as the value of: Frame time=1/(frame rate). CPU 1060 can be operative so that responsively to an activation of a trigger signal CPU 1060 can output one or more of the succession of frames for video display processing, e.g., processing output to display 1120 in real time, processing including formatting image data into an image frame format for storage of a frame in a long term storage device, e.g., memory 1084 and/or processing for formatting for transmission to an external computer. CPU 1060 can be operative to subject one or more of the succession of output frames to a decode attempt.

For attempting to decode a bar code symbol, e.g., a one dimensional bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D bar code symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Figure 6:
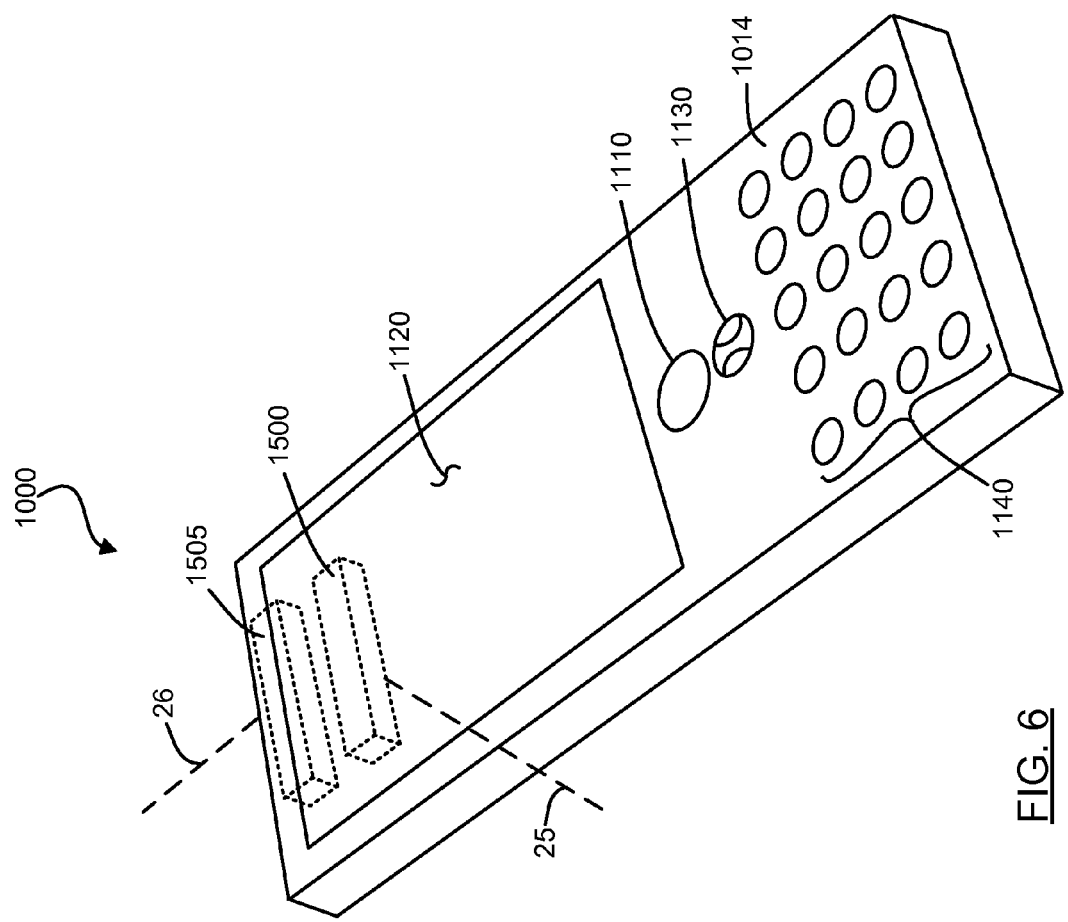
FIG. 6 is a perspective physical form view of an imaging terminal.

A physical form view of terminal 1000 in one embodiment is shown in FIG. 6. Trigger 1110, display 1120, pointer mechanism 1130, and keyboard 1140 can be disposed on a common side of a hand held housing 1014 as shown in FIG. 6. Display 1120 and pointer mechanism 1130 in combination can be regarded as a user interface of terminal 1000. Display 1120 in one embodiment can incorporate a touch panel for navigation and virtual actuator selection in which case a user interface of terminal 1000 can be provided by display 1120. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor. Imaging subsystem 1500, which can include image sensor array 1430 and imaging lens assembly 1402, can be incorporated in hand held housing 1014.

In one embodiment, imaging terminal 1000 can include a single imaging subsystem 1500. However, in FIG. 2 there is shown a block diagram of an imaging terminal 1000 having a plurality of imaging subsystems including imaging subsystem 1500 having imaging axis 25 and imaging subsystem 1505 having imaging axis 26. In FIG. 6 there is depicted a physical form view of an imaging terminal having a plurality of imaging subsystems 1500, 1505 with imaging axis 26 of imaging subsystem 1500 extending substantially perpendicular to a plane on which display 1120 extends and with imaging axis 26 of imaging subsystem 1505 extending in a direction substantially parallel to a plane on which display 1120 extends.

Regarding imaging subsystem 1505, imaging subsystem 1505 can have in one embodiment the components depicted within dashed border 1500 of FIG. 1 except that image sensor array 1430 of subsystem 1505 can be differentiated relative to image sensor array 1430 of imaging subsystem 1500.

In one embodiment, image sensor array 1430 of imaging subsystem 1500 can be provided by a color image sensor array having color filters disposed over a plurality of pixels of the image sensor array 1430, e.g., a Bayer pattern filter disposed over image sensor array 1430. Image sensor array 1430 of imaging subsystem 1505 on the other hand in one embodiment can include a monochrome pixel array comprising an array of pixels devoid of color filter elements. In one embodiment, each pixel of image sensor array 1430 of imaging subsystem 1505 can be devoid of a wavelength selective color filter. In the development of imaging terminal 1000 it was determined that for some applications, a color image sensor array 1430 is preferred whereas for other applications, a monochrome image sensor array is preferred. For example, for image archiving applications where a captured frame can be output for later viewing a display, color images have been noted in some instances to provide more easily discerned detail and a more realistic representation of an article being depicted. However, for indicia decoding applications, e.g., bar code decoding, utilization of a monochrome image sensor because of their high signal to noise ratio can allow for quicker decode times. Nevertheless, with use of terminal 1000 a monochrome image sensor array can be utilized for image archiving and a color image sensor array can be utilized for decoding of decodable indicia.

Terminal 1000 can include an illumination assembly 1240 for illumination of target, T, and projection of an illumination pattern 1260. illumination pattern 1260, in the embodiment shown can be projected to be proximate to but larger than an area defined by field of view 1240, but can also be projected in an area smaller than an area defined by a field of view 1240. Illumination assembly 1240 can include a light source bank 1242 comprising one or more light source banks. In one embodiment, illumination assembly 1240 can also include an illumination lens assembly 1244. In addition to or in place of illumination lens assembly 1244, illumination assembly 1240 can include alternative light shaping optics, e.g. one or more diffusers, mirrors and prisms. In use, terminal 1000 can be oriented by an operator with respect to a target bearing article 15 in such manner that illumination pattern 1260 is projected on a article 15. One or more of imaging subsystem 1500 and imaging assembly 1505 can be devoid of illumination subsystem 1240.

Referring to further aspects of terminal 1000, lens assembly 1402 can be controlled with use of electrical power input unit 1410 which provides energy for changing a plane of optimum focus of lens assembly 1402. In one embodiment, an electrical power input unit 1410 can operate as a controlled voltage source, and in another embodiment, as a controlled current source. Electrical power input unit 1410 can apply signals for changing optical characteristics of lens assembly 1402, e.g., for changing a focal length and/or a best focus distance of (a plane of optimum focus of) lens assembly 1402. Light source control circuit 1220 can send signals to illumination pattern light source bank 1242, e.g., for changing a level of illumination output by illumination pattern light source bank 1242.

Various embodiments for lens assemblies for use as lens assembly 1402 are now described. In the embodiment of FIG. 3, lens assembly 1402, 1244 comprises a fluid lens 1404. Fluid lens 1404 in one embodiment can be an electro-wetting fluid lens comprising a plurality of immiscible optical fluids. Fluid lens 1404 in one embodiment can be provided by an ARCTIC 314 or ARCTIC 316 fluid lens of the type available from VARIOPTIC S.A. of Lyon, France. Fluid lens 1404 can alternatively be a fluid lens of the type having a deformable surface, and can be provided in association with a mechanical actuator assembly (not shown) coupled to power input unit 1410.

Referring to FIG. 4, lens assembly 1402 can include one or more lenses in series with fluid lens 1404. In the embodiment of FIG. 4, lens 1405 can be e.g., a glass or polycarbonate lens, or a fluid lens. In the embodiment of FIG. 5, lens assembly 1402 comprises a mechanically movable lens 1406. Lens 1406, in one embodiment, can be provided by solid light transmissive material e.g., glass or polycarbonate, and can be moved with use of motor force provided by motor, M, coupled to power input unit 1410. In one embodiment, motor, M, can be provided by a hollow stepper motor and lens 1406 can be disposed within such hollow stepper motor so that lens 1406 is moved between various positions along axis 25 as is indicated by bidirectional arrow 1407. Lens assembly 1402 as shown in FIG. 5 can also include additional lenses such as lens 1405 disposed in series with lens 1406. With reference to FIGS. 3, 4, 5, imaging lens assembly 1402, in one embodiment, can be configured as a positive lens and illumination lens assembly 1244, in one embodiment can be configured as a negative lens. Lens assembly 1402 of subsystem 1500 and subsystem 1505 can have similar configurations or can be differently configured; e.g., a lens assemblies 1402 of one of the imaging subsystems 1500, 1505 can have a configuration in accordance with a first of the configurations of FIGS. 3, 4, 5, and a lens assembly 1402 of the other subsystems 1500, 1505 can have a configuration in accordance with a SECOND of the configurations of FIGS. 3, 4, 5.

Operation of imaging terminal 1000 when determining a focus setting for lens assembly 1402 is described with reference to the timing diagram of FIG. 7. With reference to the timing diagram of FIG. 7, signal 5504 indicates a trigger signal. Trigger signal 5504 can be made active by actuation of a trigger 1110. Responsively to activation of trigger signal 5504, imaging terminal 1000 can capture a plurality of frames of image data and can select a certain frame for output, e.g., for further processing for formatting to an image file format and/or storage into a storage memory and/or output onto a display. With further reference to timing diagram of FIG. 7, signal 5508 indicates an energy level signal of lens assembly 1402. Where lens assembly 1402 is a variable lens assembly, the energy level applied to lens assembly 1402 can vary over time. Each signal level indicating a different focus setting of the lens assembly 1402.

Referring to the signal 5510, signal 5510 indicates exposure periods of imaging terminal 1000 with logic high periods of signal 5510 indicating exposure on periods and periods intermediate the logic high periods off periods of exposure. In an alternative embodiment, image sensor array 1430 can be subject to continuous exposure as in a rolling shutter configuration.

Figure 7:
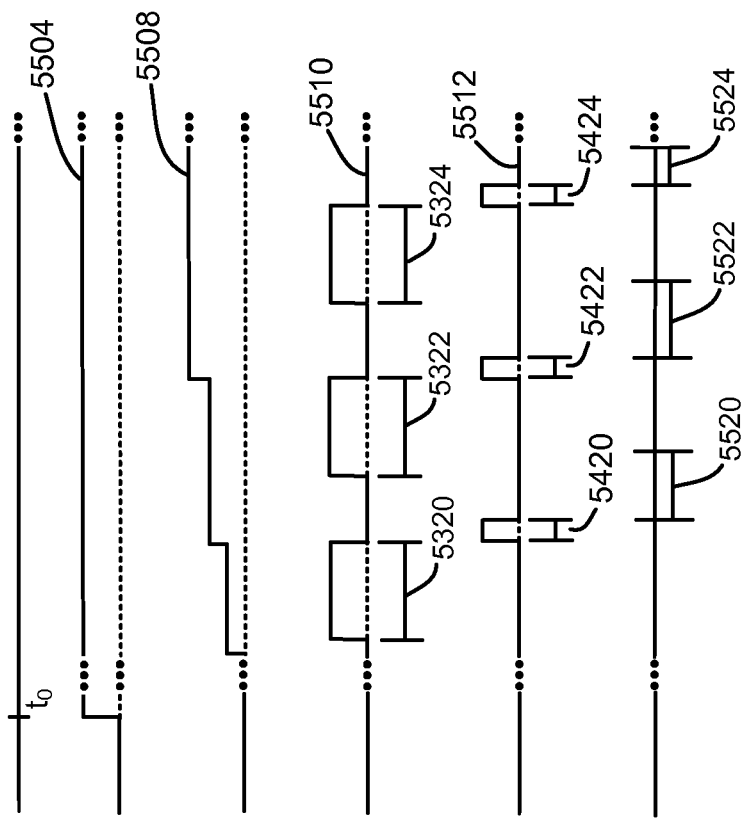
FIG. 7 is a timing diagram illustrating operation of an imaging terminal.

In the timing diagram of FIG. 7, periods 5320, 5322, 5324 indicate exposure periods of image sensor array 1430. Imaging terminal 1000 can be operative to capture a frame of image data by reading out a frame of image data subjecting the image data of the frame to conversion, and storing the frame into memory 1080. Where a succession of frames are captured, the storing of frames can comprise buffering frames into a buffer memory location. After image sensor array 1430 is exposed, charges accumulated at pixels of array 1430 can be read out, converted into digitized format, and stored into working volatile memory wherein respective frames can be subject to processing by CPU 1060.

With further reference to the timing diagram of FIG. 7, signal 5512 indicates readout signal having read out periods 5420, 5422, 5424 wherein charges accumulated at pixels of image sensor array 1430 can be read out for conversion and storage to non-volatile memory 1080. Further reference to the timing diagram of FIG. 7, periods 5520, 5522, 5524 indicate processing periods of CPU 1060. During processing periods 5520, 5522, 5524, CPU 1060 can be subjecting captured frames of image data to processing for determination of one or more imaging parameter, e.g., an exposure parameter. During processing periods 5520, 5522, 5524, CPU 1060 can further be subjecting captured frames of image data to processing for determination of a focus setting for lens assembly 1402 for capture of a frame of image data for output for visual display.

A simplified focus determination process is described with reference to timing diagram of FIG. 7. During exposure period 5320, lens assembly 1402 can be set to a first focus setting which can correspond to first energy level of signal 5508. During exposure period 5322, lens assembly 1402 can be set to a second focus setting as indicated by the second energy level of signal 5508 and during subsequent exposure period 5324, lens assembly 1402 can be set to a third focus setting as indicated by a third energy level of signal 5508. During the processing period for each subsequent frame, i.e., 5520, 5522, 5524 CPU 1060 can calculate a focus score for each subsequent captured frame of image data. A focus score, in one example, can be calculated by selecting a sample of lines, e.g., a sample of rows and/or columns of image data and subjecting the sample of pixel values to the following auto correlation equation.

$$S_{path} = \Sigma (I_n - I_{n-1})^2 \quad \text{Equation 1}$$

where $I_n$ is the pixel value at a certain pixel position n, of a path, and $I_{n-1}$ is a pixel value at a pixel position adjacent to the $n^{th}$ pixel position. For reduction of clock cycles required for performing the calculation of Equation 1, an approximation of the result of Equation 1 can be carried out by executing the calculation:

$$S_{path} = \Sigma |I_n - I_{n-1}| \quad \text{Equation 2}$$

It is seen that by application of equation 1 or 2, frames of image data having sharper contrast features will generally be attributed higher focus scores. According to a simplified focus determination process, terminal 1000 can simply select the captured frame of a plurality of subsequently captured frames having the highest focus score as the frame to output. Such a focus determination can be executed without substantial delay in the case there are a limited number of candidate focus settings of lens assembly 1402.

In the example described relative to FIG. 7, only three focus settings of lens assembly 1402 are active during a focus setting determination in which first, second, and third frames, which may be regarded as "test" frames are processed. Accordingly, determining the focus setting yielding the highest focus score can consume substantially three frame times. However, commercially available variable lens assemblies are often made available with substantial number of candidate focus settings, e.g., five, ten, one hundred, three hundred candidate focus settings. Also, some commercially available variable lens assemblies do not have the capacity to be moved between a nearest and farthest focus setting within a fastest frame time of an image sensor array.

With further reference to the timing diagram of FIG. 7, it is seen that in the case that lens assembly 1402 includes one hundred focus settings, the focus determination process described wherein a focus determination is mainly by calculating a focus score for each candidate position and selecting the best score would consume substantially one hundred frame times if the focus determination process described were applied.

For reduction of a time for focus determination various interpolation methods can be applied. For example, in one embodiment a limited number of test frames can be captured and processed, e.g., one to three frames can be subject to scoring and an optimized frame focus setting can be determined based on the data of the limited number of which focus setting may be a focus setting other than a focus setting utilized for capture of a limited number of test frames. Responsively to determination of the optimum focus setting, the focus setting of lens assembly 1402 can be changed to the determined optimum setting determined and a new frame can be captured with the focus setting at the optimum focus setting which new frame is output for further processing. However, it can be seen that even by application of such time reduction methods, existence of multiple candidate focus settings can significantly delay the capture of a frame output for further processing. For example, there can be a considerable delay between the time that the optimum focus setting is determined and the time lens assembly actual focus setting is established at the optimum focus setting. Also, according to a focus determination method that is active, the new frame that is captured with the lens assembly at the optimum focus setting can be rejected, e.g., for having a poor focus score, e.g., in the case imaging terminal 1000 is moved substantially relative to a target setting. If the new frame is rejected according to an applied process, the focus determination process can be commenced again resulting in further delay. Accordingly, it is seen that the presence of a multiple available candidate focus settings can result in a significant delay in an output of a captured frame for further processing.

In development of imaging terminal 1000, it was determined that an image output time of imaging terminal 1000 for output of a frame for visual display processing can be reduced by making available configurations of imaging terminal 1000 wherein (a) a set of candidate focus settings is truncated from a full set of candidate focus settings and/or (b) a focus setting is fixed. Further aspects of imaging terminal 1000 are described with reference to FIG. 8 illustrating an exemplary user interface utilizing display 1222 which can make available to an operator a plurality of user selectable focus configurations.

As is explained with reference to FIG. 8, imaging terminal 1000 can be made available with a plurality of focusing configurations. When a full set focusing configuration is active, imaging terminal 1000 can be operative so that a full set of candidate focus settings of lens assembly are active. Imaging terminal 1000 can determine the focus setting responsively to a trigger signal being activated.

A full set of candidate focus settings of lens assembly 1402 can be regarded as the maximum range and resolution of settings that can be defined by an entity deploying terminal 1000 with use of a full set of one or more Software Development Kits (SDKs) made available to the entity. The maximum range of focus settings can be (but do not have to be) established to coincide with the minimally near and maximally far focus settings of lens assembly 1402 as determined by the hardware limitations of lens assembly 1402.

Figure 8:
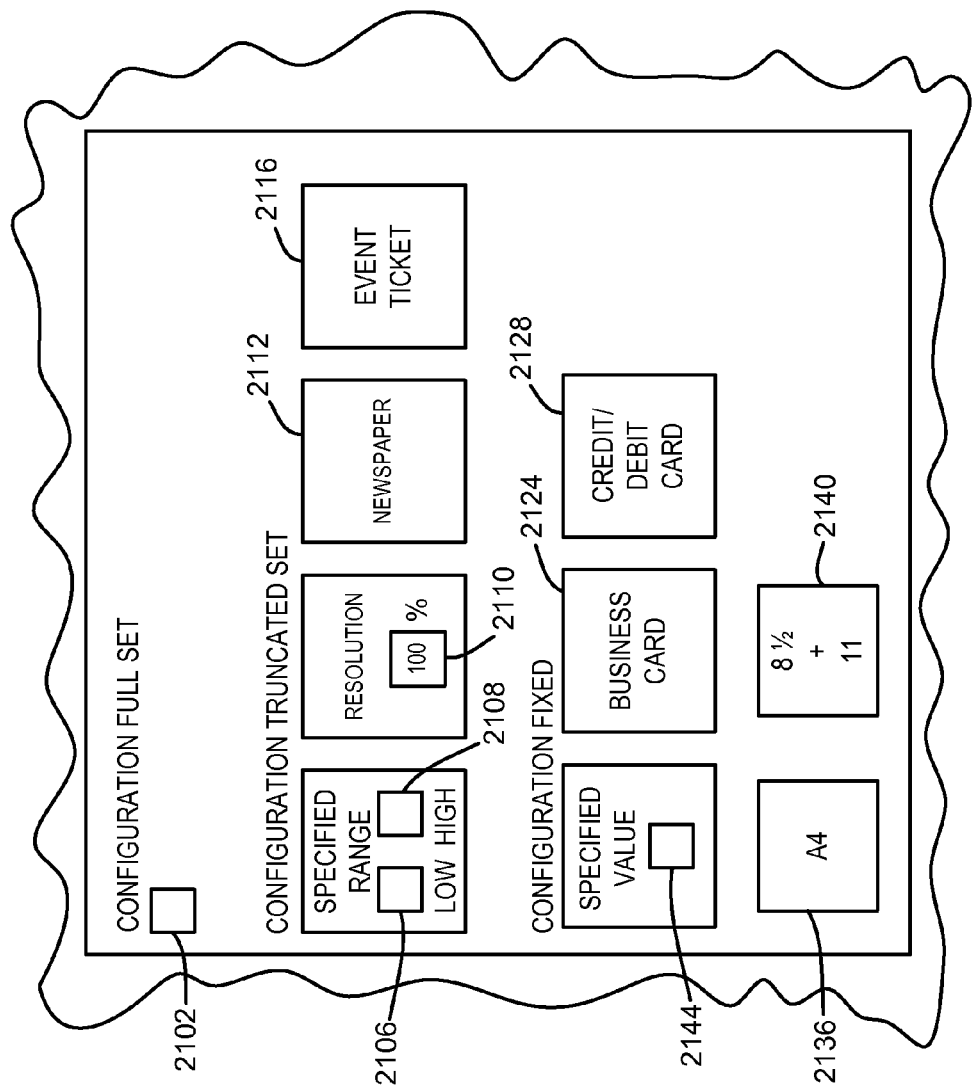
FIG. 8 is a perspective view of an imaging terminal having a plurality of operator selectable configurations.

With further reference to FIG. 8, when a truncated set focusing configurations of imaging terminal 1000 is active, terminal 1000 can be operative so that a truncated set of candidate focus settings is active when imaging terminal 1000 determines a focus setting responsively to an activation of a trigger signal.

With the truncated set focusing configuration active, focusing delay of imaging terminal 1000 can be expected to be reduced relative to a focusing delay of imaging terminal 1000 with the full set focusing configuration active. For example, depending on the focus determination method and the truncated set, there may be fewer test frames subject to examination for focus setting determination. A full set of focus settings of lens assembly 1402 can include minimally near focus setting and a maximum far focus setting, and intermediate settings corresponding to a maximum resolution of available focus settings. Focus settings of lens assembly 1402 can have corresponding energy levels designating an applied energy to be applied to lens assembly 1402 to achieve the various focus settings. In one embodiment, terminal 1000 can be configured so that data points of a number scale are utilized to define a full set of focus settings. In one embodiment, a number scale, e.g., zero to 99, can be utilized for defining 100 different discrete focus settings. In one example, a full set of candidate focus settings can comprise the settings zero designating the minimum near focus setting, the setting 99 designating the maximum far focus setting, and 98 additional discrete focus setting values between the minimally near and maximum far focus settings.

When the truncated set focusing configuration is made active, the minimum near focus setting can be increased to a higher value and/or the maximum far focus setting can be reduced, and/or the number of available discrete focus setting values between the minimum and maximum can be changed. Examples of truncated sets of candidate focus settings continuing with the described example include, e.g., the range 0-94 comprising 95 discrete settings, 5-99 also comprising 95 discrete settings, 25-30 comprising six discrete settings, 50-70 comprising twenty one discrete settings, 0-99 with reduced resolution so there are only three possible discrete settings; 0, 50, and 99, and 40-59 with only three candidate settings of reduced resolution, namely 40, 50 and 59. In a described example, in the integer values describing each focus setting can correspond the same as focus settings of lens assembly 1402 through the various focus configurations described. Activation of a truncated set focusing configuration can restrict a candidate set of focus of focus settings of lens assembly 1402 to a set of focus settings that exclude a current focus setting of lens assembly 1402 at the time of activation of the truncated set focusing configuration. Terminal 1000 can be operative to so that terminal 1000 can establish a setting of lens assembly 1402 at a setting within a candidate set of settings responsively to an activation of the truncated set focusing configuration so that the setting is already at a valid setting at a time of activation of a trigger signal.

Referring to a fixed focusing configuration of imaging terminal 1000, terminal 1000 can be operative so that when a fixed focusing configuration is made active, a focus setting of lens assembly is established at a fixed focus setting and restricted from varying from the fixed setting value responsively to activation of a trigger signal. In one embodiment of the fixed focusing configuration, a focus setting of lens assembly 1402 is caused to move to the fixed setting value responsively to activation of trigger signal. In another example of the fixed focusing configuration, the lens assembly is set to the fixed focus setting responsively to the configuration being made active so that prior to a time of activation of trigger signal, the focus setting of lens assembly is already at the fixed focus setting value, and therefore, a delay time for allowing physical transition of a lens assembly 1402 is avoided. In either case, imaging terminal 1000 can be restricted from executing a focus determination process responsively to activation of trigger signal, the focus setting already having been established prior with the activation of the configuration prior to the time the trigger signal is activated.

Regarding the truncated set focusing configuration (truncated set of candidate focus settings active) and the fixed focusing configuration (fixed focus setting active), a plurality of different focusing modes of operation can be activated for the activation focusing configuration. In the particularly described embodiment, the full set focusing configuration can have a particular associated user selected focusing mode of operation (the focusing mode of operation activated by the activation of button 2102). With reference to focusing modes of operation that are in accordance with the truncated set focusing configuration, it was determined that certain articles which may be desirable to subject to image capture may not be available in a specific standard size but may be available in a range of sizes that do not vary significantly.

Examples of articles that are available in sizes that are fairly consistent but not specific size are newspapers and event tickets. Terminal 1000 can be operative so that when button 2112 is selected, a candidate set of focus settings suitable for capturing a captured image of a newspaper can be active when imaging terminal 1000 performs a focus determination responsively to a trigger signal activation. When button 2116 is selected, a candidate set of focus settings suitable for capture of a focused image of an event ticket is active when terminal 1000 performs a focus determination responsively to a trigger signal activation.

With reference to area 2106 and 2108, an operator can enter operator designated focus setting values. When focus setting values have been entered using areas 2106 and 2108, imaging terminal 1000 in accordance with the truncated set focusing configuration can be operative so that truncated set of candidate focus settings specified in areas 2106 and specified by the values entered in areas 2106 and 2108, is active when imaging terminal 1000 determines a focus setting responsively to activation of trigger signal. Referring to area 2110, the user interface of FIG. 8 can have area 2110 for designating a resolution of a candidate set of focus settings with a "default" value being 100%. If a resolution is reduced using area 2110, a resolution of the set of focus settings is reduced, i.e., if there 100 (0-99) full set settings and a resolution of 11% is selected using area 2110, a defined set of positions (11% the number of settings available with full resolution selected) can be the focus settings defined by the focus setting values (0, 9, 19, 29, 39, 49, 59, 69, 79, 89, 99).

Further in the development of imaging terminal 1000, it was determined that certain articles commonly subject to image capture which may be desirable to subject to image capture are available in a specific size. Such articles include A8 business cards available in the size 74×52 mm, credit and debit cards available in the size 85.6×53.98 mm, A4 paper documents, and 8½×11 inch documents (always available in the size 8½×11 inches).

In a further aspect of imaging terminal 1000, imaging terminal 1000 can be operative so that when button 2124 is selected, imaging terminal 1000 in accordance with the described fixed focusing configuration establishes a focus setting of lens assembly 1402 at a focus setting suitable for capture of a focused image representing an A8 business card.

In a further aspect of imaging terminal 1000, imaging terminal 1000 can be operative so that when button 2128 is selected, imaging terminal 1000 in accordance with the described fixed focusing configuration establishes a focus setting of lens assembly 1402 at a focus setting suitable for capture of a focused image representing debit/credit cards.

In a further aspect of imaging terminal 1000, imaging terminal 1000 can be operative so that when button 2136 is selected, imaging terminal 1000 in accordance with the described fixed focusing configuration establishes a focus setting of lens assembly 1402 at a focus setting suitable for capture of a focused image representing A4 paper documents.

In a further aspect of imaging terminal 1000, imaging terminal 1000 can be operative so that when button 2140 is selected, imaging terminal 1000 in accordance with the described fixed focusing configuration establishes a focus setting of lens assembly 1402 at a focus setting suitable for capture of a focused image representing 8½×11 inch documents.

Imaging terminal 1000 can further be operative so that when a specified value is entered into area 2144, imaging terminal 1000 in accordance with the fixed described focusing configuration establishes a focus setting of lens assembly

1402 at a fixed focus setting corresponding to the specified focus setting value entered using area 2144.

With reference to the user interface depicted in FIG. 8, it is seen that a plurality of modes of operation can be made accessible by selection of a button that is designated by a common (friendly) name specifying a known article. Accordingly, an operator can select a desired mode of operation merely by selecting the button presenting a prompt referencing a known article without having to calculate or specify a focus setting value or range for the article desired to subject to image output.

It has been set forth herein that modes of operation corresponding to articles having non-standard but expected ranges are categorized as modes of operation under the truncated set focusing configuration while modes of operation corresponding to articles having discrete specific sizes are categorized as modes of operation under the fixed focusing configuration. It is understood that activating the truncated set focusing configuration with a mode of operation corresponding to a standard size article and activating the fixed focusing configuration with a mode of operation corresponding to an expected range article can also provide suitable images with reduced image output time.

In the development of imaging terminal 1000, it was determined that for improving a sharpness and consistency of frames with use of imaging terminal 1000 with a focus setting of lens assembly 1402 set to a fixed or truncated set of focus settings imaging terminal 1000 can be positioned substantially at a certain terminal to target distance during capture of an image that is output for further processing. For improving operation of imaging terminal 1000, imaging terminal 1000 can be provided as a part of a system (which can be regarded as a kit) which in addition to imaging terminal 1000 includes an instruction manual 2602. Instruction manual 2602 can include at least the instruction indicating to an operator that during capture of images for output of a selected frame for visual display processing, imaging terminal 1000 and an article 2604 to be subject to image capture should be positioned at relative spacing distances so that representation of article 2604R as indicated in FIG. 9 extends to a specified border of display 1222 (i.e., "fills" the border). Such specified border is conveniently designated as the border of display 1222; however, a displayed border smaller than the border of display 1222 can also be utilized.

With reference to FIG. 9, imaging terminal 1000 operated for output of a frame of image data can be operative so that a representation 2604R corresponding to an article 2604 being subject to image capture is display on display 1222 in real time during image capture. It will be seen that by prompting an operator to adjust the relative distances of an article subject to image capture and the terminal 1000 so that the article representation 2604 fills a specified border can result in like-sized articles subject to image capture being captured with consistent sharpness and resolution. Focus settings as described herein including fixed focus settings and ranges can be established so that well focused frames of image data are output with article representations, e.g., representation 2604R filling a specified border of a display 1222.

In the embodiment of FIG. 9, instruction manual 2602 is shown as being provided by a paper instruction manual. However, in another embodiment, instruction manual 2602 can be an electronically displayed instruction manual. For example, instruction manual 2602 can be provided on an HTML webpage accessible with any HTML enabled computer including terminal 1000. In one embodiment, an instruction prompting an operator to adjust the relative spacing between terminal 1000 and article 2604 can be displayed on display 1222 in real time during image capture while imaging terminal 1000 displays article representation 2604R. In the described example, imaging terminal 1000 displays the prompting message "fill screen" while displaying the article representation 2604R which prompts the operator to adjust the relative positions of terminal 1000 and article 2604 so that the representation 2604R of article 2604 fills the screen 1222 in at least one of a horizontal or vertical direction as is depicted in FIG. 10. Imaging terminal 1000 can be operative so that imaging terminal 1000 adjusts orientation of the prompting message, e.g., depending on the article corresponding to the selected mode of operation. Terminal 1000 can be operative so that the prompting message 2610 is displayed at a specific orientation which will encourage an operator to utilize terminal 1000 for output of an image of preferred resolution for the article being captured.

In the use case depicted with reference to FIG. 9, imaging terminal 1000 includes a vertically extending display 1222 and image sensor array 1430 also extends vertically. Article 2604, however, has a horizontal extending major axis access. Terminal 1000 can be operative so that for such use case prompting message 2610 can be displayed vertically as shown. However, for the use case where the article 2604 has a vertically extending major axis as in an A4 or an 8½×11 inch standard document, terminal 1000 can be operative to display prompting message 2610 horizontally on display screen 1222.

In the use case of FIG. 9, imaging subsystem 1500 is depicted as performing image capture. However, it is understood that terminal 1000 can be configured to perform image capture, processing and output in accordance with methodologies described with reference to FIGS. 1-9 herein utilizing either or both of imaging subsystem 1500 and imaging subsystem 1505.

A small sample of systems methods and apparatus that are described herein is as follows:

A1. An imaging terminal comprising:

an image sensor array and an imaging lens assembly for focusing an image of a target onto the image sensor array, the image sensor array having a plurality of pixels, the imaging lens assembly being a variable imaging lens assembly capable of being set to a plurality of different focus settings;

a hand held housing incorporating the image sensor array;

wherein the imaging terminal is capable of operating in a full set focusing configuration, a truncated set focusing configuration, and a fixed focusing configuration, the full set focusing configuration, the truncated set focusing configuration, and the fixed focusing configuration being user selectable;

wherein the imaging terminal is operative so that when the full set selectable focusing configuration is active, a full set of candidate focus settings are active when the imaging terminal determines a focus setting for the imaging lens assembly responsively to a trigger signal activation;

wherein the imaging terminal is further operative so that when the truncated set of focusing configuration is active, a truncated set of candidate focus settings are active when the imaging terminal determines a focus setting for the imaging lens assembly responsively to a trigger signal activation;

wherein the imaging terminal is further operative so that when the fixed focusing configuration is active, a predetermined focus setting is active when a trigger signal is activated.

A2. The imaging terminal of A1, wherein responsively to the fixed focusing configuration being made active the imaging terminal changes a focus setting of the imaging lens assembly to the predetermined focus setting so that the focus setting of the imaging lens assembly is established at the predetermined focus setting prior to a time of activation of the trigger signal.

A3. The imaging terminal of A1, wherein the truncated set of candidate focus settings comprises a smaller range relative to a range of focus settings associated to the full set of candidate focus settings.

A4. The imaging terminal of A1, wherein the truncated set of candidate focus settings comprises a lower resolution relative to a resolution of the full set of candidate focus settings.

B1. An imaging terminal comprising:
  an image sensor array and an imaging lens assembly for focusing an image of a target onto the image sensor array, the image sensor array having a plurality of pixels, the imaging lens assembly being a variable imaging lens assembly capable of being set to a plurality of different focus settings;
    a hand held housing incorporating the image sensor array;
    wherein the imaging terminal is capable of operating in first, second, and third user selectable focusing modes of operation;
    wherein the imaging terminal is operative so that when the first user selectable focusing mode of operation is active, a first set of candidate focus settings are active when the imaging terminal determines a focus setting for the imaging lens assembly responsively to a trigger signal activation;
    wherein the imaging terminal is operative so that when the second user selectable focusing mode of operation is active, a second set of candidate focus settings are active when the imaging terminal determines a focus setting for the imaging lens assembly responsively to a trigger signal activation;
    wherein the imaging terminal is further operative so that when the third user selectable focusing mode of operation is active, a predetermined focus setting is active when a trigger signal is activated.

B2. The imaging terminal of B1, wherein the imaging terminal is operative so that the first candidate set of focus settings is defined utilizing range information input by a user, and wherein the imaging terminal is further operative so that the second candidate set of the focus settings is defined by selection of a prompt presented by the imaging terminal that references a common name for a specific article type.

B3. The imaging terminal of B1, wherein the imaging terminal includes a display and is operative so that a representation of an article being subject to image capture is displayed during image capturing; and wherein the imaging terminal is included in a system having an instruction manual including an instruction prompting an operator to alter relative positions of an article and the imaging terminal while the article is being subject to image capture so that a specified border of the display is filled with a representation of the article.

C1. An imaging terminal comprising:
  an image sensor array and an imaging lens assembly for focusing an image of a target onto the image sensor array, the image sensor array having a plurality of pixels, the imaging lens assembly being a variable imaging lens assembly capable of being set to a plurality of different focus settings;
    a hand held housing incorporating the image sensor array;
    wherein the imaging terminal is capable of operating in first and second user selectable focusing configurations;
    wherein the imaging terminal is operative so that when the first user selectable focusing configuration is active, a set of candidate focus settings are active when the imaging terminal determines a focus setting for the imaging lens assembly responsively to a trigger signal activation;
    wherein the imaging terminal is further operative so that when the second user selectable focusing configuration is active, a predetermined focus setting is active when a trigger signal is activated.

C2. The imaging terminal of C1, wherein the imaging terminal is operative to present a prompt that prompts an operator to select the second user selectable focusing configuration, the prompt referencing a common name for a specific article type.

C3. The imaging terminal of C1, wherein the imaging terminal is operative so that when the first user selectable focusing configuration is active, a full set of candidate focusing settings are active when a trigger signal is activated, the first focusing configuration being a full set focusing configuration.

C4. The imaging terminal of C1, wherein the imaging terminal is operative so that when the first user selectable focusing configuration is active, a truncated set of candidate focus settings are active when a trigger signal is activated, the first focusing configuration being a truncated set focusing configuration.

C5. The imaging terminal of C1, wherein the imaging terminal includes a display and wherein the imaging terminal is operative to display an article representation corresponding to an article being subject to image capture on the display, wherein the imaging terminal is operative to display a prompt on the display prompting a user to change a relative position of the article and the imaging terminal so that the article representation fills a specified border of the display.

D1. A system comprising:
  an imaging terminal having an image sensor array and an imaging lens assembly for focusing an image of a target onto the image sensor array, the image sensor array having a plurality of pixels, the imaging terminal further having a hand held housing incorporating the image sensor array, the imaging terminal further having a display and being operative to display on the display an article representation of an article being subject to image capture;
    an instruction manual for prompting a user of the imaging terminal to change a relative position between the imaging terminal and the article so that the article representation fills a specified border of the display.

D2. The system of D1, wherein the system is configured so that the instruction manual is electronically displayed on the display.

D3. The system of D1, wherein the imaging lens assembly is a variable imaging lens assembly capable of being set to a plurality of different focus settings, and wherein the imaging terminal is capable of operating in a first user selectable focusing mode of operation corresponding to a first article type and a second user selectable focusing mode of operation corresponding to a second article type, wherein the imaging terminal is operative so that during capture of an article representation with the first user selectable focusing mode of operation active, the imaging terminal determines a focus setting of the imaging lens assembly at a first focus setting, and wherein the imaging terminal is further operative so that during capture of an article representation with the second user selectable focusing mode of operation active, the imaging terminal determines a focus setting of the imaging lens assembly at a second focus setting.

D4. The system of D1, wherein the imaging lens assembly is a variable imaging lens assembly capable of being set to a plurality of different focus settings, and wherein the imaging terminal is capable of operating in a first user selectable focusing mode of operation corresponding to a first article type and a second user selectable focusing mode of operation corresponding to a second article type, wherein the imaging terminal is operative so that during capture of an article representation with the first user selectable focusing mode of operation active, the imaging terminal determines a focus setting of the imaging lens assembly at a first focusing setting and the prompting comprises a message displayed vertically on the display, and wherein the imaging terminal is further operative so that during capture of an article representation with the second user selectable focusing mode of operation active, the imaging terminal determines a focus setting of the imaging lens assembly at a second focus setting and the prompting comprises a message displayed horizontally on the display.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

We claim:

1. An imaging terminal comprising:
an image sensor array and an imaging lens assembly for focusing an image of a target onto the image sensor array, the image sensor array having a plurality of pixels, the imaging lens assembly being a variable imaging lens assembly capable of being set to a plurality of different focus settings;
a hand held housing incorporating the image sensor array;
wherein the imaging terminal is capable of operating in a full set focusing configuration, a truncated set focusing configuration, and a fixed focusing configuration, the full set focusing configuration, the truncated set focusing configuration, and the fixed focusing configuration being user selectable;
wherein the imaging terminal is operative so that when the full set selectable focusing configuration is active, a full set of candidate focus settings are active when the imaging terminal determines a focus setting for the imaging lens assembly responsively to a trigger signal activation;
wherein the imaging terminal is further operative so that when the truncated set focusing configuration is active, a truncated set of candidate focus settings are active when the imaging terminal determines a focus setting for the imaging lens assembly responsively to a trigger signal activation;
wherein the imaging terminal is further operative so that when the fixed focusing configuration is active, a predetermined focus setting is active when a trigger signal is activated.

2. The imaging terminal of claim 1, wherein responsively to the fixed focusing configuration being made active the imaging terminal changes a focus setting of the imaging lens assembly to the predetermined focus setting so that the focus setting of the imaging lens assembly is established at the predetermined focus setting prior to a time of activation of the trigger signal.

3. The imaging terminal of claim 1, wherein the truncated set of candidate focus settings comprises a smaller range relative to a range of focus settings associated to the full set of candidate focus settings.

4. The imaging terminal of claim 1, wherein the truncated set of candidate focus settings comprises a lower resolution relative to a resolution of the full set of candidate focus settings.

5. An imaging terminal comprising:
an image sensor array and an imaging lens assembly for focusing an image of a target onto the image sensor array, the image sensor array having a plurality of pixels, the imaging lens assembly being a variable imaging lens assembly capable of being set to a plurality of different focus settings;
a hand held housing incorporating the image sensor array;
wherein the imaging terminal is capable of operating in first, second, and third user selectable focusing modes of operation;
wherein the imaging terminal is operative so that when the first user selectable focusing mode of operation is active, a first set of candidate focus settings are active when the imaging terminal determines a focus setting for the imaging lens assembly responsively to a trigger signal activation;
wherein the imaging terminal is operative so that when the second user selectable focusing mode of operation is active, a second set of candidate focus settings are active when the imaging terminal determines a focus setting for the imaging lens assembly responsively to a trigger signal activation;
wherein the imaging terminal is further operative so that when the third user selectable focusing mode of operation is active, a predetermined focus setting is active when a trigger signal is activated.

6. The imaging terminal of claim 5, wherein the imaging terminal is operative so that the first candidate set of focus settings is defined utilizing range information input by a user, and wherein the imaging terminal is further operative so that the second candidate set of the focus settings is defined by selection of a second prompt presented by the imaging terminal that references a common name for a specific article type.

7. The imaging terminal of claim 5, wherein the imaging terminal includes a display and is operative so that a representation of an article being subject to image capture is displayed during image capturing; and wherein the imaging terminal is included in a system having an instruction manual including an instruction prompting an operator to alter relative positions of an article and the imaging terminal while the article is being subject to image capture so that a specified border of the display is filled with a representation of the article.

8. An imaging terminal comprising:
an image sensor array and an imaging lens assembly for focusing an image of a target onto the image sensor array, the image sensor array having a plurality of pixels, the imaging lens assembly being a variable imaging lens assembly capable of being set to a plurality of different focus settings;
a hand held housing incorporating the image sensor array;
wherein the imaging terminal is capable of operating in first and second user selectable focusing configurations;
wherein the imaging terminal is operative so that when the first user selectable focusing configuration is active, a set of candidate focus settings are active when the imaging terminal determines a focus setting for the imaging lens assembly responsively to a trigger signal activation;
wherein the imaging terminal is further operative so that when the second user selectable focusing configuration is active, a predetermined focus setting is active when a trigger signal is activated; and wherein the imaging terminal is operative to present a prompt that prompts an operator to select the second user selectable focusing configuration, the prompt referencing a common name for a specific article type.

9. The imaging terminal of claim 8, wherein the imaging terminal is operative so that when the first user selectable focusing configuration is active, a full set of candidate focusing settings are active when a trigger signal is activated, the first focusing configuration being a full set focusing configuration.

10. The imaging terminal of claim 8, wherein the imaging terminal is operative so that when the first user selectable focusing configuration is active, a truncated set of candidate focus settings are active when a trigger signal is activated, the first focusing configuration being a truncated set focusing configuration.

11. The imaging terminal of claim 8, wherein the imaging terminal includes a display and wherein the imaging terminal is operative to display an article representation corresponding to an article being subject to image capture on the display, wherein the imaging terminal is operative to display a second prompt on the display prompting a user to change a relative position of the article and the imaging terminal so that the article representation fills a specified border of the display.

12. A system comprising:
an imaging terminal having an image sensor array and an imaging lens assembly for focusing an image of a target onto the image sensor array, the image sensor array having a plurality of pixels, the imaging terminal further having a hand held housing incorporating the image sensor array, the imaging terminal further having a display and being operative to display on the display an article representation of an article being subject to image capture;
an instruction manual for prompting a user of the imaging terminal to change a relative position between the imaging terminal and the article so that the article representation fills a specified border of the display;
wherein the imaging lens assembly is a variable imaging lens assembly capable of being set to a plurality of different focus settings, and wherein the imaging terminal is capable of operating in a first user selectable focusing mode of operation corresponding to a first article type and a second user selectable focusing mode of operation corresponding to a second article type, wherein the imaging terminal is operative so that during capture of an article representation with the first user selectable focusing mode of operation active, the imaging terminal determines a focus setting of the imaging lens assembly at a first focus setting, and wherein the imaging terminal is further operative so that during capture of an article representation with the second user selectable focusing mode of operation active, the imaging terminal determines a focus setting of the imaging lens assembly at a second focus setting.

13. The system of claim 12, wherein the system is configured so that the instruction manual is electronically displayed on the display.

14. The system of claim 12, wherein the imaging lens assembly is a variable imaging lens assembly capable of being set to a plurality of different focus settings, and wherein the imaging terminal is capable of operating in a first user selectable focusing mode of operation corresponding to a first article type and a second user selectable focusing mode of operation corresponding to a second article type, wherein the imaging terminal is operative so that during capture of an article representation with the first user selectable focusing mode of operation active, the imaging terminal determines a focus setting of the imaging lens assembly at a first focusing setting and prompts an operator by displaying a message vertically on the display, and wherein the imaging terminal is further operative so that during capture of an article representation with the second user selectable focusing mode of operation active, the imaging terminal determines a focus setting of the imaging lens assembly at a second focus setting and prompts an operator by displaying a second message horizontally on the display.

15. The system of claim 12, wherein the specified border is characterized by one or more of (a) the specified border is rectangular, (b) the specified border has a closed perimeter, (c) the specified border includes first and second straight edges that are perpendicular to one another, (d) the specified border includes first and second straight edges that are parallel to one another, and (e) the specified border is defined by a display.

* * * * *